United States Patent [19]

Ring et al.

[11] Patent Number: 5,697,001
[45] Date of Patent: Dec. 9, 1997

[54] CAMERA FOR GENERATING AND RECORDING OBJECT DATA WITH THE RECORDED IMAGE

[75] Inventors: Stuart F. Ring; John R. Squilla, both of Rochester; Richard Bettencourt, Webster, all of N.Y.

[73] Assignee: Eastman Kodak Company, Rochester, N.Y.

[21] Appl. No.: 637,317

[22] Filed: Apr. 24, 1996

[51] Int. Cl.⁶ ............................. G03B 13/36; G03B 17/24
[52] U.S. Cl. ............................. 396/121; 396/310
[58] Field of Search ............................. 396/106, 116, 396/117, 118, 121, 122, 123, 311, 319, 320, 321, 310, 315–317, 287; 348/232, 61; 382/165, 162, 199, 200

[56] References Cited

U.S. PATENT DOCUMENTS

| | | | |
|---|---|---|---|
| 4,183,013 | 1/1980 | Agrawala et al. | 340/146.3 |
| 4,640,613 | 2/1987 | Yokoyama et al. | 356/1 |
| 5,008,695 | 4/1991 | Nagaoka et al. | 354/403 |
| 5,218,392 | 6/1993 | Sakamoto et al. | 396/315 |
| 5,289,227 | 2/1994 | Kinjo | 396/106 X |
| 5,374,985 | 12/1994 | Beadles et al. | 356/1 |
| 5,386,263 | 1/1995 | Kotani et al. | 354/403 |
| 5,404,196 | 4/1995 | Terashita et al. | 396/311 X |

Primary Examiner—W. B. Perkey
Attorney, Agent, or Firm—David M. Woods

[57] ABSTRACT

A photographic camera includes means for capturing and recording an image, a scanner for generating object data indicating the relative location of objects within the image, and an electronic processing section for combining the object data with the recorded image. In one embodiment the camera is a film camera including an optical section for focusing the image upon a film plane where a film is located, and the electronic processing section includes means for recording the object data upon the film. In another embodiment the camera is an electronic camera including an image sensor for capturing the image and producing image data, and the electronic processing section transfers the image data and the object data to an output storage section. In another aspect of the invention, an electronic image processing system comprises a computer and the electronic camera as described above, wherein the computer interfaces with the output section in the camera and accesses the image data and the object data in order to characterize the objects within the image.

21 Claims, 7 Drawing Sheets

CAMERA FOR GENERATING AND RECORDING OBJECT DATA WITH THE RECORDED IMAGE

FIELD OF THE INVENTION

This invention is related to the field of photography, and in particular to cameras that generate data about the location of objects within the viewing field.

BACKGROUND OF THE INVENTION

It is known that a camera (either a traditional film or a digital camera) can have a rangefinder on it that determines the focal distance for the picture. For instance, in U.S. Pat. No. 5,386,263 a multi-beam-type rangefinding method and device uses three LEDs arranged along a line perpendicular to a base line, and a position sensitive detector for receiving light reflected from three measurement regions of a photographic scene. It is also known that there are technologies available to determine distances over an area. IR, radar and audio techniques are examples. Emitters and detectors are available that can provide the methods to capture this information. It is also known that digital cameras and film cameras have the ability to record additional information along with the image.

Although information about objects in a pictorial image could be important in determining additional uses and functionalities for an image, no convenient mechanism exists today to gather and record this information at the point and time of image capture.

SUMMARY OF THE INVENTION

The present invention is directed to overcoming one or more of the problems stated above. Briefly summarized, according to one aspect of the present invention, a photographic camera includes means for capturing and recording an image, a scanner for generating object data indicating the relative location of objects within the image, and an electronic processing section for combining the object data with the recorded image.

In one embodiment the camera is a film camera, the means for capturing and recording the image includes an optical section for focusing the image upon a film plane where a film is located, and the electronic processing section includes means for recording the object data upon the film. In another embodiment the camera is an electronic camera, the means for capturing and recording the image includes an image sensor for capturing the image and producing image data, and the electronic processing section transfers the image data and the object data to an output storage section.

In another aspect of the invention, an electronic image processing system comprises a computer and the electronic camera as described above, wherein the computer interfaces with the output section in the camera and accesses the image data and the object data in order to characterize the objects within the image.

The advantageous effect of the invention centers upon the contemporaneous capture of a two-dimensional array of values associated with objects in each image. For example, these values can be reflectance values or ranging data. Being contemporaneous with the image, this data is captured and stored with the original image as a digital file, either on a film used to capture the image or with an image file created by an electronic image sensor. The digital file can then be used to provide information that can be used for distance estimation, or cutting and pasting objects from the image into an existing template or application.

An example of an application is in the insurance industry. Currently, pictures are taken and used as visual accompaniment of textual information. With this invention, the objects of interest, as well as information about the image (such as dent size, dimensions of a home, or damage to roofs) can be captured as part of the image and acted upon differently depending on the type of object contained in the image (e.g., to compute the size of a dent, compare it with a wire-frame, etc., versus looking at a roof of a house to estimate square footage for replacement purposes).

This invention is generally relevant to image segmentation, where more functionality can be added to the pixel information. Associations that are currently made to the general image can now be appended to individual "objects" within the images.

Another application is for special effects in order to more easily isolate objects within images and then use these objects on different backgrounds.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
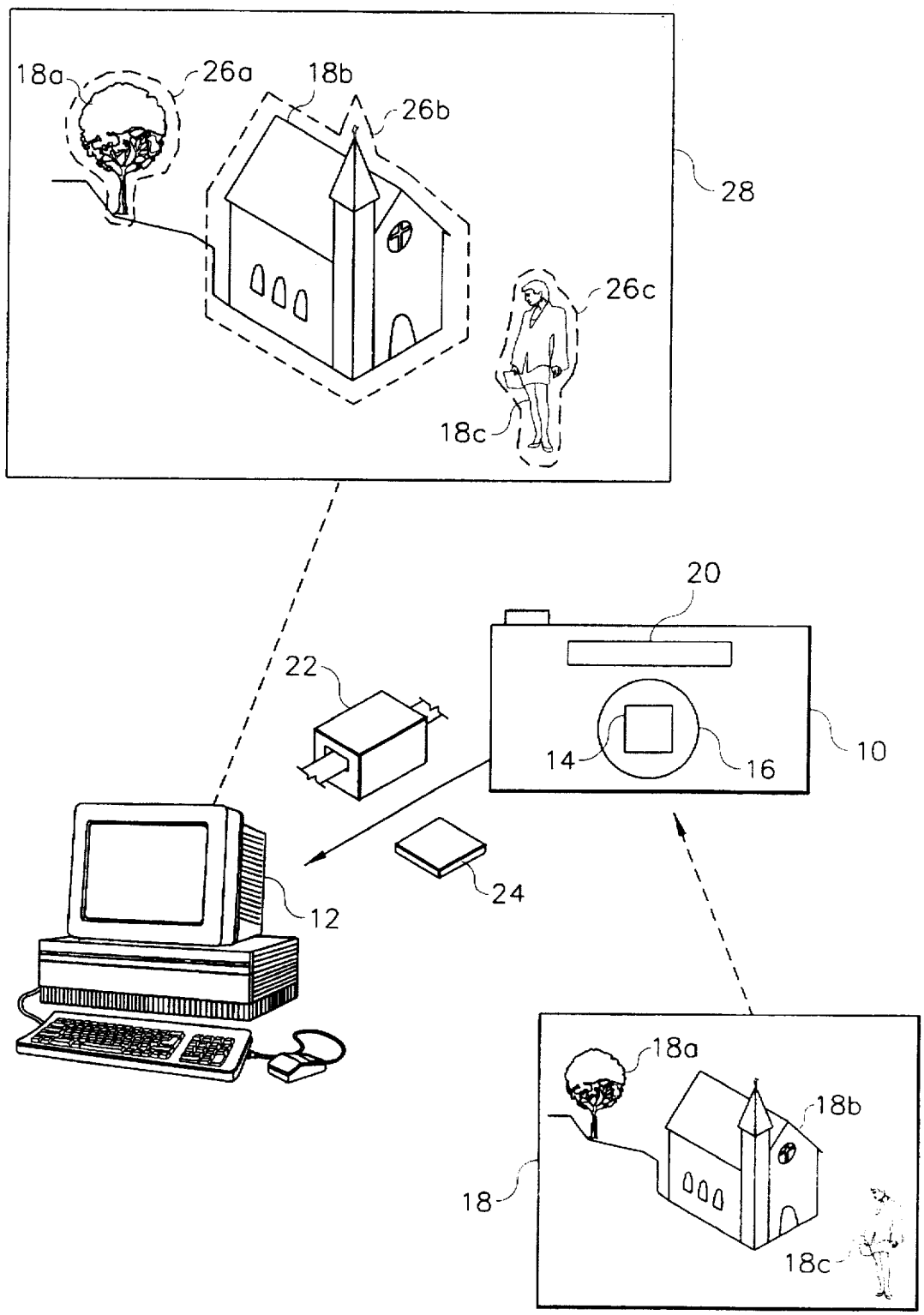
FIG. 1 is a diagram illustrating the concepts of the invention.

Referring first to FIG. 1, the concept of the invention is shown in a system comprising a camera 10 and a host computer 12. The camera 10 includes an image sensing medium 14, such as a film or a charge-coupled-device (CCD) image sensor. A lens 16 focuses an image of an object field 18 upon the image sensing medium 14, which produces a recorded image either on the film or in a signal output from the CCD. The camera 10 also includes a scanning device 20, such as a rangefinder, which produces object information, such as ranging data, uniquely determinative of the objects 18a, 18b, and 18c in the object field 18. If the camera 10 is a film camera, the object information is recorded as a digital file on the film and subsequently read by a film scanner 22; if the camera is electronic, the object information is associated with the image data and recorded, e.g., on a memory card 24.

The image data is then applied to the host processor 12, which uses the object information to indicate the relative location of objects within the image and thereby to enable feature extraction and object description. For example, the host processor 12 contains algorithms that process the object information and determine the boundaries 26a, 26b and 26c that are uniquely determinative of the relative location and/or position of the objects 18a, 18b and 18c, respectively, in the processed object field 28. Such information is useful in multimedia applications of the image, where different parts of the image are used to initiate different multimedia activities as well as in intelligent movement (cutting and pasting) of parts of the image to other images (which might also involve automated sizing, tone reproduction, etc.). In an extension of the concept, the object location functionality can be performed in the camera if the camera contains a microprocessor and sufficient working memory. Moreover, the object descriptions could be encapsulated as a software object (component) for use in downstream applications.

Figure 2:
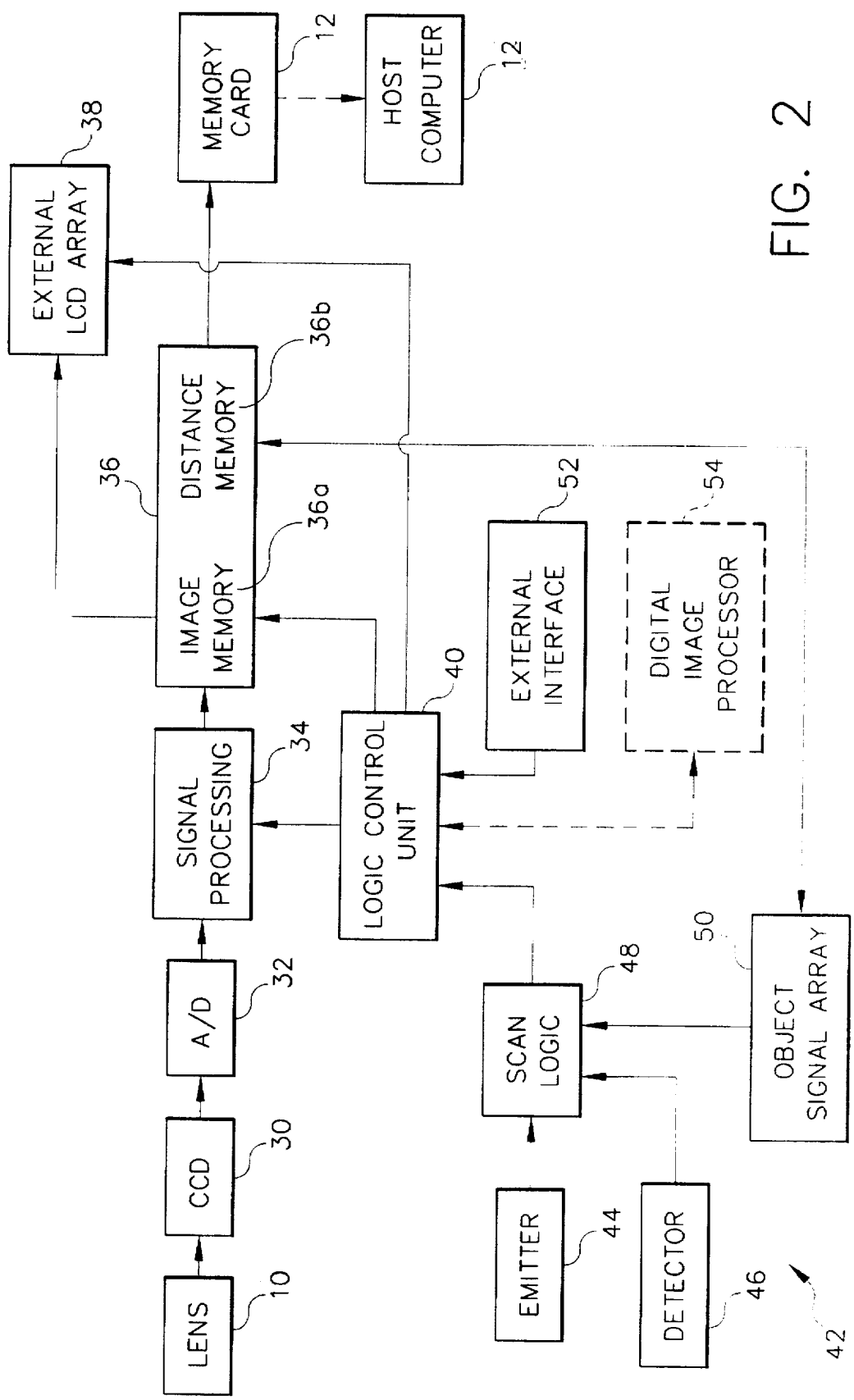
FIG. 2 is a block diagram of an electronic camera including the features of the invention.
Figure 3A:
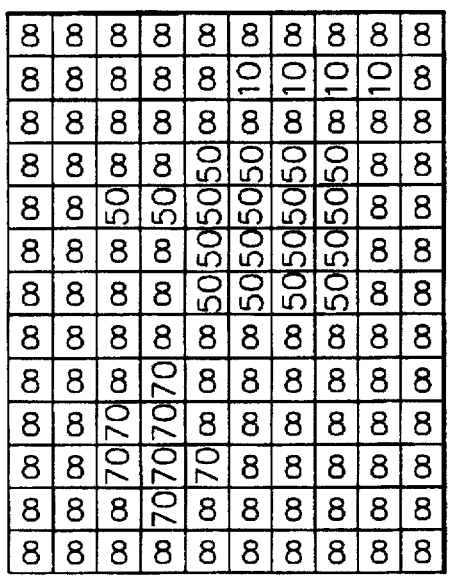
FIG. 3(A) is a diagram of an object information array generated by the camera of FIG. 2.
Figure 3B:
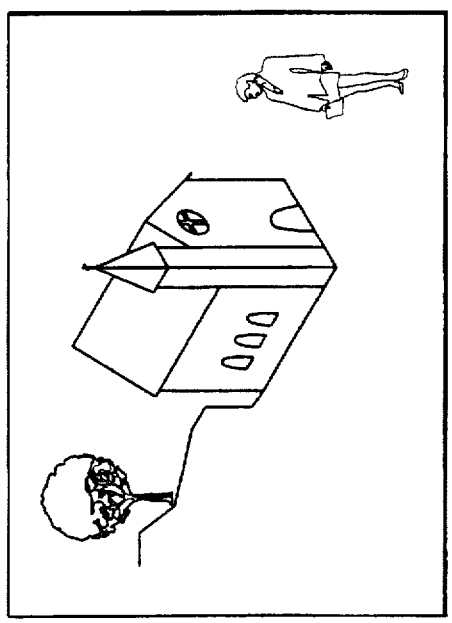
FIG. 3(B) is an illustration of the corresponding image.

The electronic version of the camera 10 is shown in a block diagram in FIG. 2. An image focused upon a CCD image sensor 30 by the lens 16 is digitized in an analog-to-digital (A/D) converter 32. The digitized image signal is processed in a signal processing section 34 and stored in a memory 36, which has an image memory section 36a and an object memory section 36b. The image can be displayed on an externally mounted liquid crystal display (LCD) array 38. A logic control unit 40 controls the operation of the signal processing section 34, the memory 36 and the LCD array 38. An image scanner 42, which generates the object information, includes an emitter 44, a detector 46, and a scanning logic section 48. The image scanner 42 collects a two-dimensional array of values associated with each image, and stores these values in the object signal array 50. An example of an object array based on distance is shown in FIG. 3(A), which corresponds to the image of the object field 18 shown in FIG. 3(B). The numerical values in the array correspond to the relative distances of the respective objects from the camera 10. These values are then stored as a digital file in the object memory section 36b.

According to the conceptual diagram of FIG. 1, the image data and the object data are together transferred from the memory 36 to the host computer 12 for image analysis and processing. This is ordinarily done by transferring the image data and the object data to an externally removable memory, e.g., the memory card 24, according to interface requirements established by an external interface section 52. Alternatively, the camera 10 could be tethered to the host computer 12 with a cable, or other types of memory could be used, such as optical media, magnetic disk, or the like. Instead of doing the image analysis outside of the camera 10, the camera itself could include a digital image processor 54 for performing the analysis (shown in broken line to indicate that this is an option).

Figure 6:
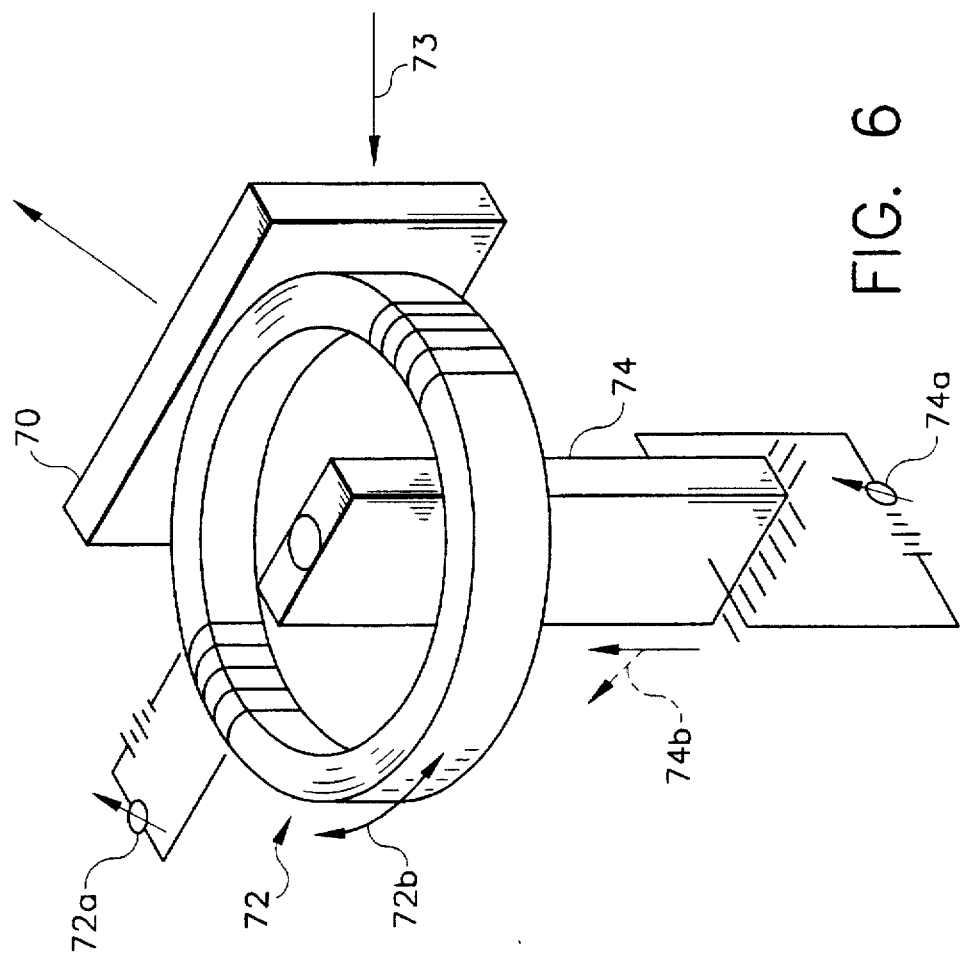
FIG. 6 illustrates a raster scanning mechanism that may be used in the scanning system shown in FIG. 4.
Figure 4:
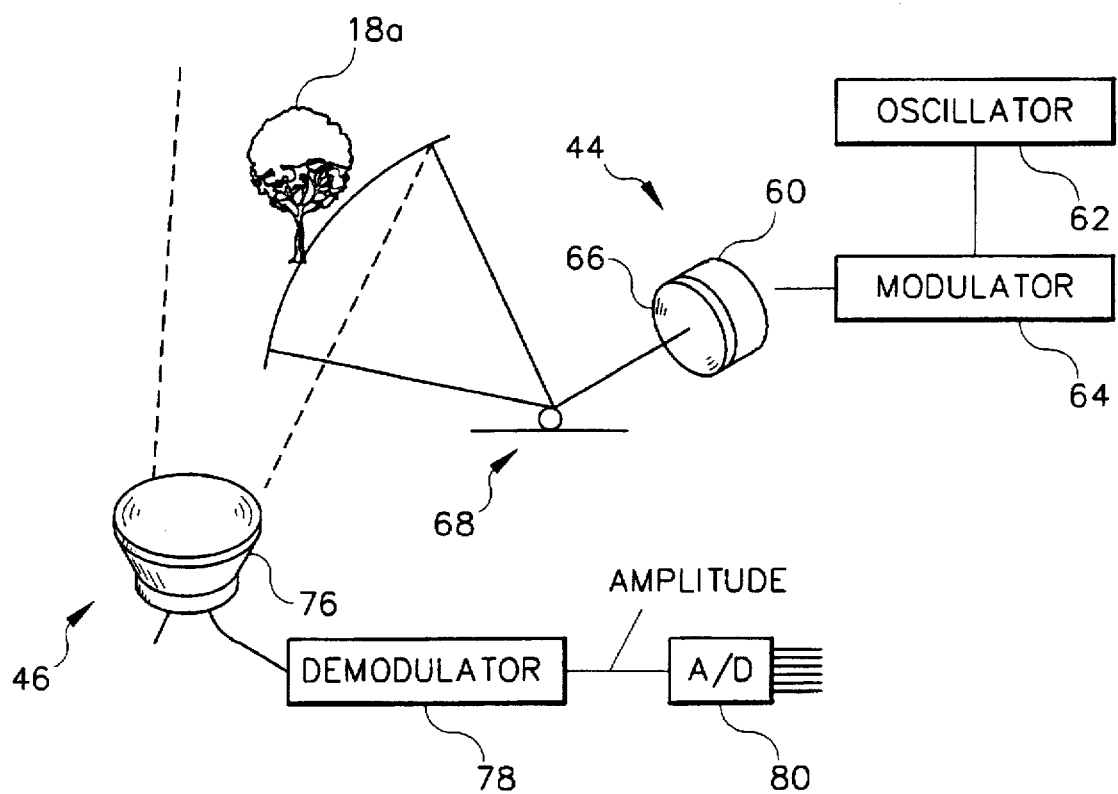
FIG. 4 is a diagram of a scanning system useful in the camera of FIG. 2.

A suitable embodiment of the image scanner 42 is shown in FIG. 4. The emitter 44 includes a low cost infrared (IR) source diode 60, of the type currently used in conventional cameras for focus ranging. The source diode 60 is driven by a signal from an oscillator 62 that is frequency modulated by a modulator 64 to allow separation of the emitted IR signal from background IR radiation of the same wavelength. The IR signal (i.e., the emitted light) from the source diode 60 is collimated to a few degrees (dependent on scanning resolution desired) by a collimating lens 66 and the scene is scanned through a raster scanning mechanism 68. A number of conventional embodiments are possible for the raster scanning mechanism 68. One such embodiment shown in FIG. 6 includes a reflective element 70 mounted on a meter movement 72 (horizontal scan) which is cantilevered on a piezoelectric element 74 (vertical scan indexing). The meter movement 72 is driven by a controller 72a to cycle the reflective element 70 back and forth through a short arc 72b to perform horizontal scanning of an input beam 73, while the piezoelectric element 74 is driven by a controller 74a to bend the reflective element through a direction 74b to perform vertical scanning of the input beam 73.

Figure 5A:
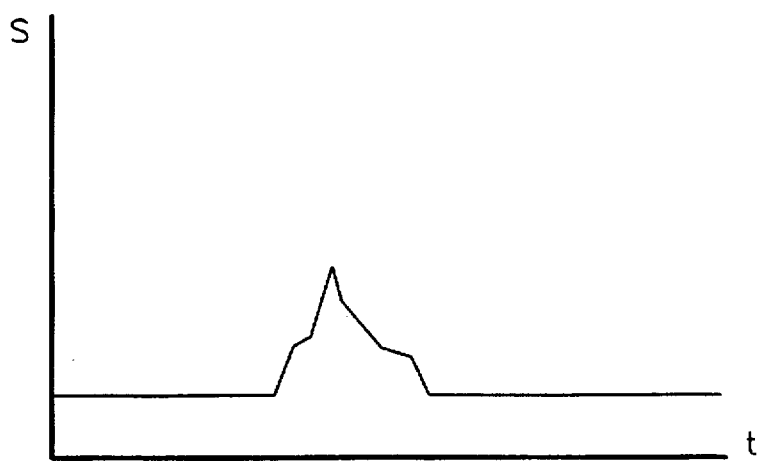
FIGS. 5(A), 5(B), and 5(C) are graphs of the scan signal at different stages of the scanning system of FIG. 4.
Figure 5B:
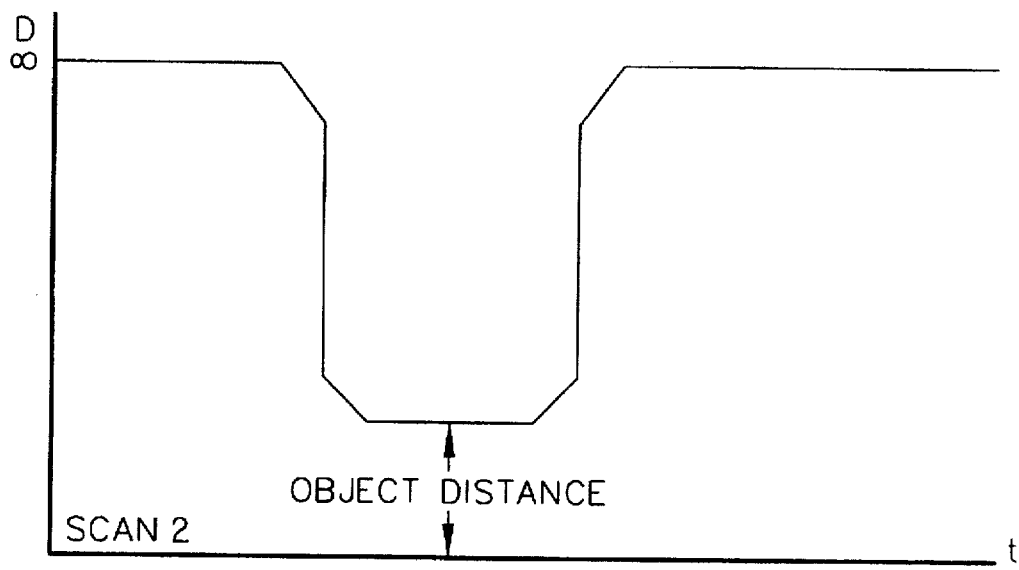
Figure 5C:
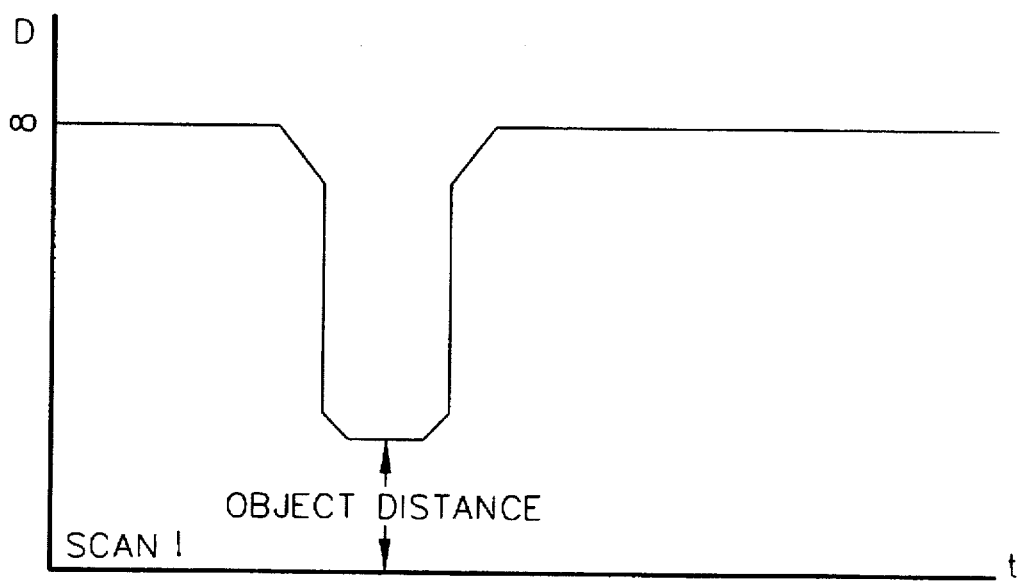

Referring to FIG. 4, the emitter 46 includes a wide field IR detector 76 to detect the background plus the frequency modulated signal reflected from the subject 18a. The amplitude of the modulated signal, shown in FIG. 5(A), is measured in a demodulator 78. The demodulated signal is sampled (A/D) in an A/D converter 80 in the time domain at points corresponding to scene elements (i.e., a geometric relationship is established between the range sample time, reflective element position, and image pixel locations) and a matrix of IR amplitude samples is created for the scene (as shown in FIG. 3(A)) and stored in the object signal array 50. In practice, the analog amplitude signal can be thresholded so that the digital values tend to separate into distinct levels indicative of distance, as shown in FIGS. 5(B) and 5(C). FIG. 5(B) is a thresholded lower section of the (tree) image 18a, while FIG. 5(C) is a thresholded upper section of the image 18a. Where an object of some reflectance is encountered by the emitted beam, the signal from the reflected beam will be of consistent amplitude except at the object boundaries where it will change, either because there is no close-by object or a nearby object has a different reflectance. The goal of this measurement is an estimate of the range (where the signal is dependent on object reflectance as well as range) and the boundaries of each object (signal changes) in the object field 18.

Figure 7:
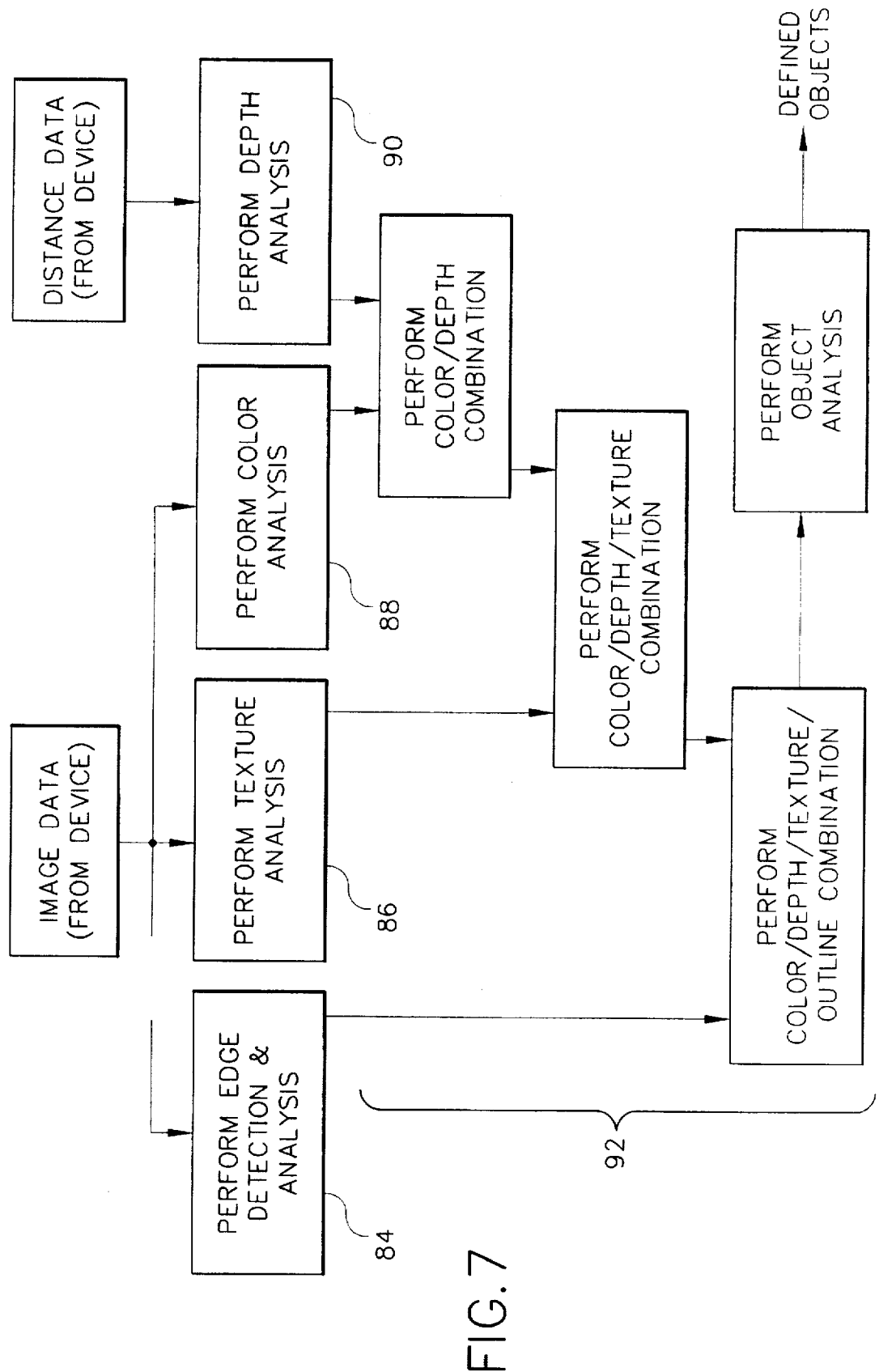
FIG. 7 is a block diagram of an image analysis process utilizing object data according to the invention.

The range and boundary information is input to the feature extraction process shown in FIG. 7. The goal of the feature extraction processing is to describe scene objects. Objects are defined as those scene elements which share a common color+common boundary+common distance+common texture. Boundaries can be estimated by changes in color, texture, range, and spatial transitions. These changes can be found by processing the object matrix (see FIG. 3(A)) for changes, e.g., in range, and image processing of the image pixel data in the color and spatial domains for changes in color, texture, and spatial continuity. The combination of all of the above features provides a high probability that all image pixels having the same color, texture, range and within the estimated boundary are part of a useful object. The object then can be defined by a graphic representation (e.g., splines) of its boundary and its centroid relative to the image boundaries as well as color and texture.

The feature extraction process involves a combination of steps, such as (shown in FIG. 7) the steps of edge detection 84, texture analysis 86, color analysis 88, depth analysis 90, and final analysis 92. These steps are performed upon image data obtained from the image sensing element 14 and object data obtained by the image scanner 42. One feature of the invention is that the image data and the object data are obtained substantially at the same time in the image capture device, i.e., in the camera 10. The feature extraction process can be described according to the goal of each step in the process, as follows:

a) Edge Detection

The goal of the step of edge detection 84 and analysis is to identify those pixels that are contained within the boundaries of the edge of a scene object. The image is converted into gray scale or the green channel of the image is used. A high pass filter such as a Laplacian filter is applied to the image and the resulting image scanned line by line for maxima in the gradient. When a maxima is encountered, a tracing algorithm follows the maximum of the gradient around the object until it reaches the starting point again. This process is repeated throughout the image.

b) Texture Analysis

The goal of the step of texture analysis 86 is to identify those pixels that are adjacent and have the same texture. It is desirable that the texture analysis used be insensitive to object rotation and be scale invariant. In practice, texture analysis is limitedly the sampling resolution of the scene. A local variance operation is based on calculating the variance in the gray values of pixels in a window (chosen according to sampling resolution). The adjacent pixels with similar variance are then collected into regions. This technique can be applied iteratively with different window sizes to smooth the region description.

c) Color Analysis

The goal of the step of color analysis 88 is to identify those pixels that are adjacent and have the same hue. The hue value is calculated for each pixel and compared to the mean hue value in an appropriate window to determine whether the pixel is likely to be part of the same object. Adjacent pixels passing this test are then collected into regions.

d) Depth Analysis

The goal of the step of depth analysis 90 is to obtain an estimate of the range and boundaries of the object. The range estimate can be obtained from signals dependent upon object reflectance (such as the data obtained from the image scanner shown in FIG. 4) or from ranging data obtained, e.g., from baseline measurements (such as shown, e.g., in the aforementioned U.S. Pat. No. 5,386,263, which is incorporated herein by reference).

e) Final Analysis

In the step of final analysis 92, the regions gathered from the above analyses of edges, texture, and color are then compared with the distance information from the scene range finding scan to estimate characteristics of the scene objects.

The result of the final analysis 92 can be used in connection with a pictorial image to enable many additional applications and functionalities for the image. An exemplary list of such additional applications and functionalities includes:

- identification of objects within a scene
- determination of object size, shape and location (within the image) relative to other objects and the camera
- determination of the object surface texture and reflectance
- determination of areas within a scene that requires additional data gathering
- logically linking different scenes together (automatic determination that images are of the same general scene, make-up and components)
- detection of changes in the scene and objects within the scene
- assistance in classification of images and objects within the images
- assistance in the ability to join multiple images
- determination of the relative size of an object in an image (based on shape and color)
- determination of the relative size of an object in an image (based on histogram data and position)
- treating of different parts of the image differently (both photographically, digitally, and in post processing)
- providing additional functionality for selecting and using objects within a scene (scene and image navigation)
- detection and elimination of defects
- determination of standard objects to enable estimate of actual sizing
- improvement in compositing of images through automated image scaling
- analysis of shadow, texture and depth for 3D determination. Linkage between images and graphics.
- determination of the lighting sources and types
- linkages to other modalities (light, sound, data, heat, etc.)

Figure 8:
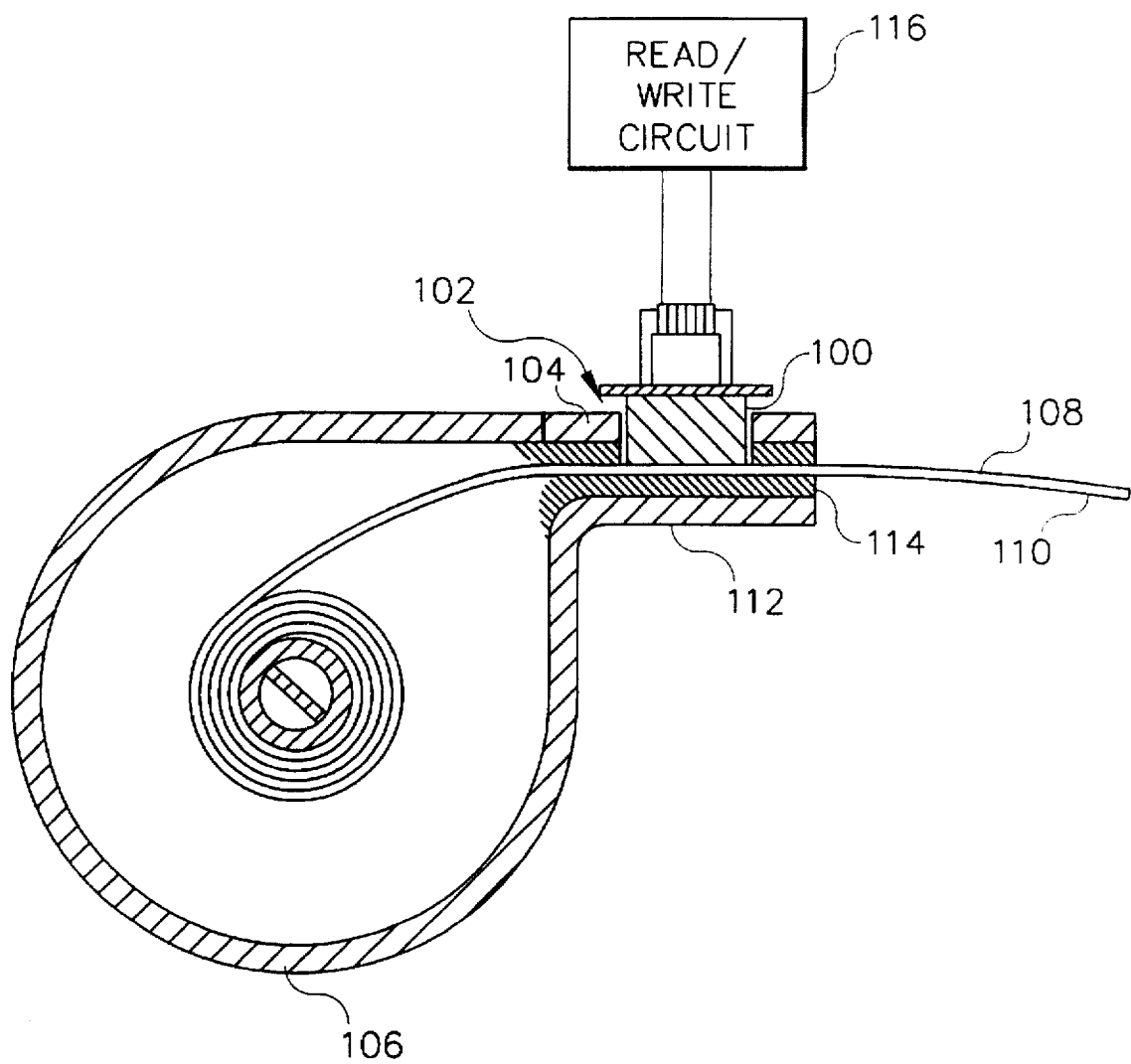
FIG. 8 is a diagram of recording apparatus useful in a film camera for recording object data according to the invention.

Although an electronic camera has been the focus of this disclosure, the invention could also be used with a film camera, in particular a film camera of the type (Advantix) recently announced by Eastman Kodak Company. Film used in that type of camera has a virtually transparent magnetic coating covering the film and dedicated recording areas on the coating for recording such information as film type, film speed, film exposure information, and information relevant to the processing and subsequent use (e.g., printing) of the film. As shown in part in FIG. 8, magnetic recording apparatus for a film camera 10 comprises a conventional magnetic read/write head 100 mounted on a flexure (not shown) attached to the rear door (not shown) of the camera 10. The head 100 is positioned so that when the rear door of the camera is closed, it will enter an opening 102 in a lip 104 of a film cartridge 106 and engage a magnetic coating 108 on a film 110. A lower portion 112 of the lip 104 and plush material 114 underlying the lip provide a compliant support for the film 110. A read/write circuit 116 provides the interface shown in FIG. 2 for writing object data from the object signal array 50 onto the magnetic coating. The object data is then recovered by the scanner 22 shown in FIG. 1.

The invention has been described with reference to a preferred embodiment. However, it will be appreciated that variations and modifications can be effected by a person of ordinary skill in the art without departing from the scope of the invention.

PARTS LIST 10 camera
12 host computer
14 image sensing medium
16 lens
18 object field
18a,b,c objects
20 scanning device
22 film scanner
24 memory card
26 boundary outlines
28 processed object field
30 CCD image sensor
32 A/D converter
34 signal processing section
36 memory
36a image memory section
36b object memory section
38 LCD array
40 logic control unit
42 image scanner
44 emitter
46 detector
48 scanning logic section
50 object signal array
52 external interface
54 digital image processor
60 IR source diode
62 oscillator
64 modulator 66 collimating lens
68 raster scanning mechanism
70 reflective element
72 meter movement
72a controller
72b arc
73 input beam
74 piezo electric element
74a controller
74b direction
76 wide field IR detector
78 demodulator
80 A/D converter
84 edge detection
86 texture analysis
88 color analysis
90 depth analysis
92 final analysis
100 read/write head
102 opening
104 lip
106 film cartridge
108 magnetic coating
110 film
112 lower portion of lip
114 plush material
116 read/write circuit

We claim:

1. A photographic camera, comprising:

means for capturing and recording an image;

a scanner for generating object data indicating the relative distance from the camera of a plurality of objects within the image; and an electronic processing section for combining the object data with the recorded image in order to facilitate feature extraction and description of the objects.

2. A camera as claimed in claim 1 wherein the camera is a film camera, the means for capturing and recording the image includes an optical section for focusing the image upon a film plane where a film is located, and the electronic processing section includes means for recording the object data upon the film.

3. A camera as claimed in claim 1 wherein the camera is an electronic camera including an output storage section, the means for capturing and recording the image includes an image sensor for capturing the image and producing image data, and the electronic processing section transfers the image data and the object data to the output storage section.

4. An electronic camera, comprising an image sensor for capturing an image and producing image data;

a scanner for generating object data indicating the relative distance from the camera of a plurality of objects within the image;

an output section; and an electronic processing section for transferring the image data and the object data for the plurality of objects to the output section.

5. A electronic image processing system comprising a computer and the electronic camera as claimed in claim 4 wherein the computer interfaces with the output section in the camera and accesses the image data and the object data in order to characterize the objects within the image.

6. An electronic camera, comprising:

an image sensor for capturing an image and producing image data;

a rangefinder for generating ranging data indicating the distance from the camera of a plurality of objects within the image;

an output section; and an electronic processing section for transferring the image data and the ranging data for the plurality of objects to the output section.

7. An electronic image processing system comprising a computer and the electronic camera as claimed in claim 6 wherein the computer interfaces with the output section in the camera and accesses the image data and the ranging data in order to characterize the objects within the image.

8. A system for processing an image in order to describe scene objects, said system comprising:

means for scanning a plurality of scene objects within an image and generating ranging data indicating the relative distance from the camera of the objects within the image;

means for capturing the image;

means for transferring the image data and the ranging data for the plurality of objects to a processing section; and means for operating the processing section to extract features and thereby describe scene objects.

9. A system as claimed in claim 8 wherein the processing section provides image processing in the color and spatial domains.

10. A system as claimed in claim 8 wherein the scanning means and the capturing means operate substantially simultaneously to generate the ranging data and the image.

11. A system as claimed in claim 8 wherein the image is captured on a film.

12. A system as claimed in claim 8 wherein the image is captured on an electronic sensor.

13. A method for processing an image in order to extract features and describe scene objects, said method comprising the steps of:

scanning a plurality of scene objects within an image and generating ranging data indicating the relative distance from the camera of the objects within the image;

capturing the image data;

transferring the image and the ranging data for the plurality of objects to a processing section; and operating the processing section to extract features and thereby describe scene objects.

14. A method as claimed in claim 13 wherein the image is captured on a film.

15. A method as claimed in claim 13 wherein the image is captured on an electronic sensor.

16. A method for processing an image in order to extract features and describe scene objects, said method comprising the steps of:

capturing an image of the scene objects and generating image data;

scanning the scene objects and generating object data indicating the relative location of the objects within the image;

performing edge detection and analysis of the image data and generating edge data;

performing texture analysis of the image data and generating texture data;

performing color analysis of the image data and generating color data;

performing depth analysis on the object data and generating depth data; and generating an estimate of the range and boundary of an object in the image from a combination of the edge, texture, color, and depth data.

17. A photographic camera, comprising:

means for capturing and recording an image;

a scanner for generating object data indicating the location of objects within the image; and an electronic processing section for generating a two-dimensional array of numerical values corresponding to the relative distances of respective objects from the camera and combining the array of numerical values with the recorded image in order to facilitate feature extraction and description of the objects.

18. A camera as claimed in claim 17 wherein the camera is a film camera, the means for capturing and recording the image includes an optical section for focusing the image upon a film plane where a film is located, and the electronic processing section includes means for recording the object data upon the film.

19. A camera as claimed in claim 17 wherein the camera is an electronic camera including an output storage section, the means for capturing and recording the image includes an image sensor for capturing the image and producing image data, and the electronic processing section transfers the image data and the object data to the output storage section.

20. A camera as claimed in claim 19 wherein the electronic processing section of the electronic camera further includes the capability to extract image features and describe the objects.

21. A camera as claimed in claim 17 wherein the numerical values combined with the recorded image are processed by an external host processor that includes the capability to extract image features and describe the objects.

* * * * *